Patented Dec. 9, 1930

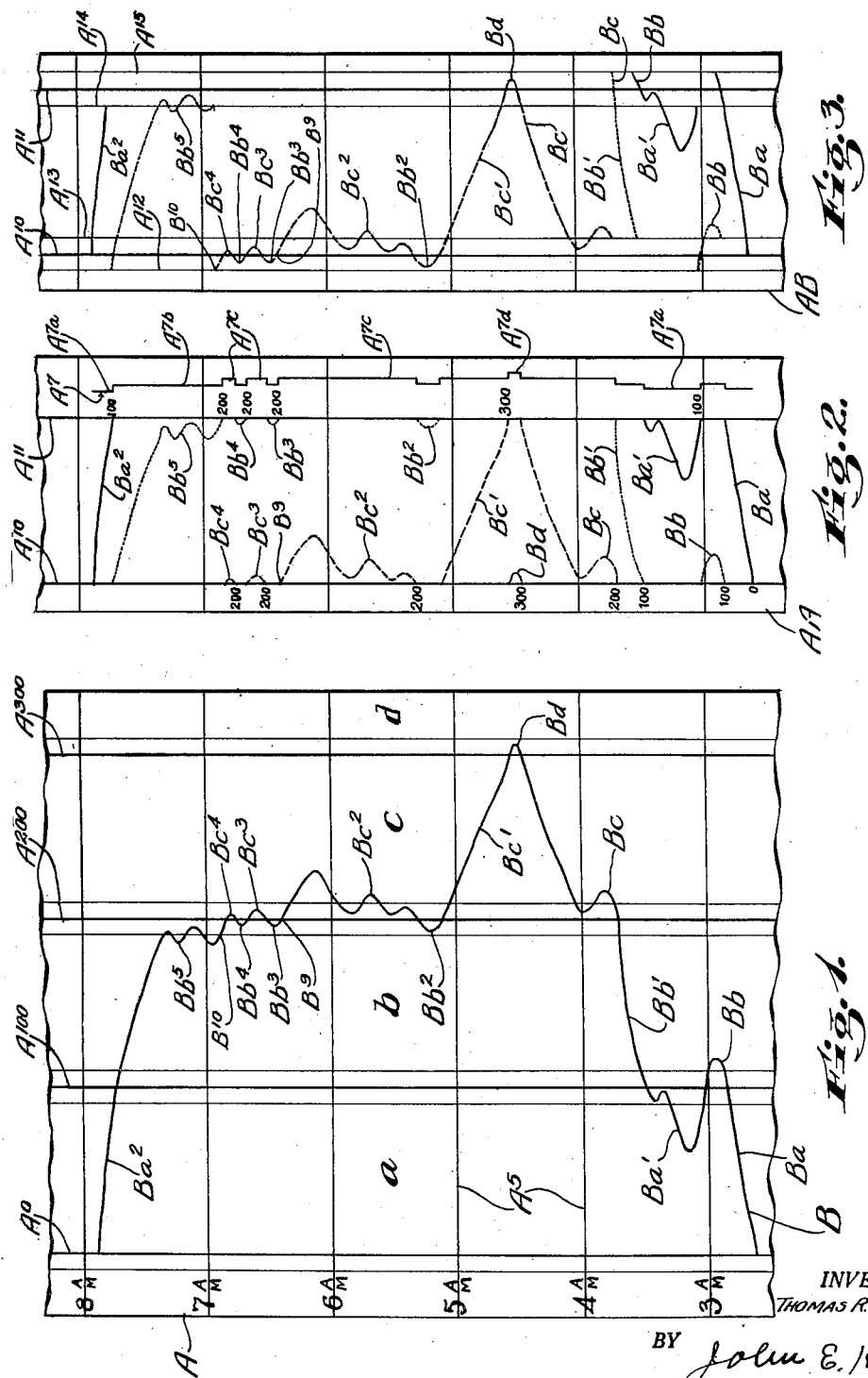

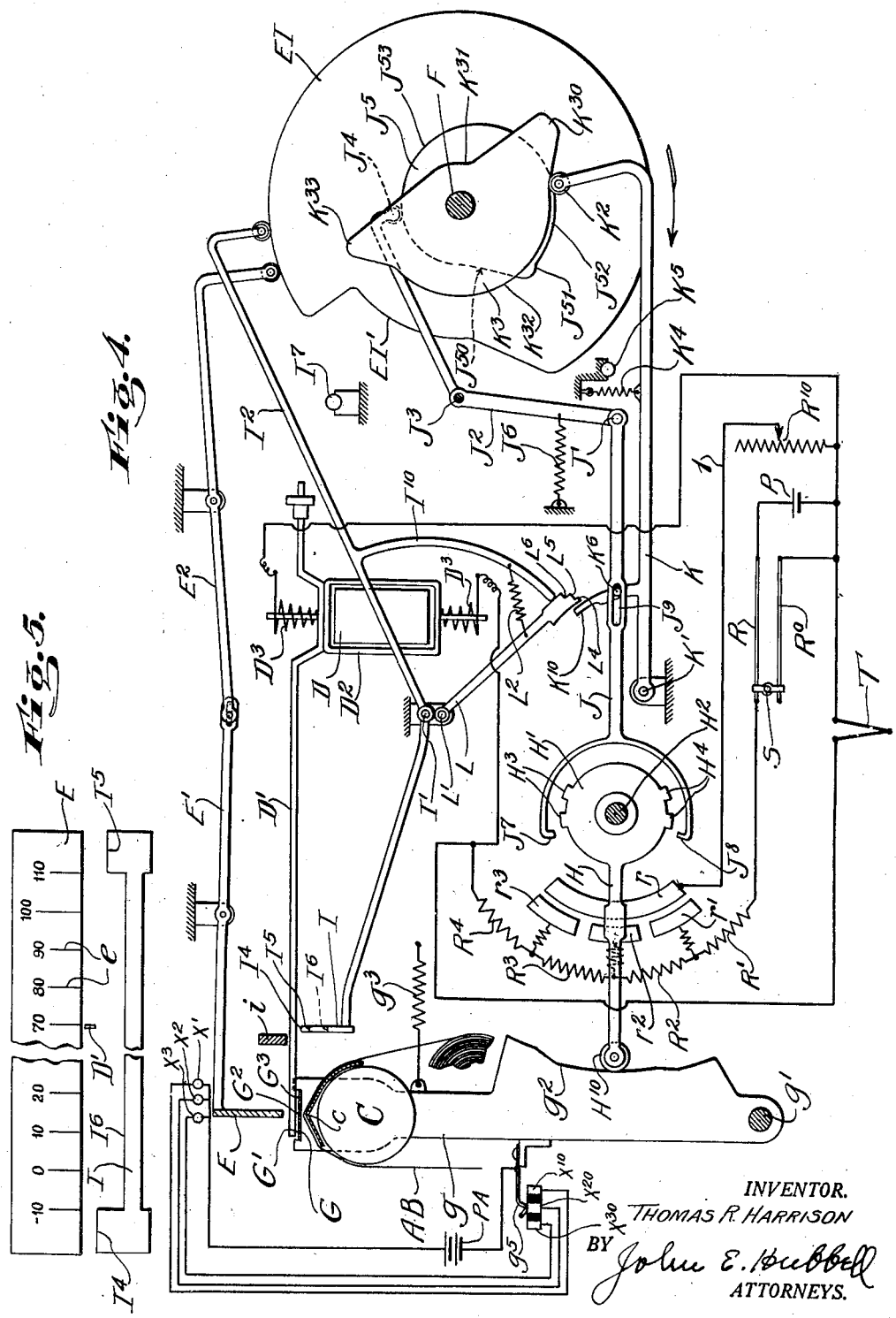

1,784,522

UNITED STATES PATENT OFFICE

THOMAS R. HARRISON, OF WYNCOTE, PENNSYLVANIA, ASSIGNOR TO THE BROWN INSTRUMENT COMPANY, OF PHILADELPHIA, PENNSYLVANIA, A CORPORATION OF PENNSYLVANIA

METHOD OF AND APPARATUS FOR MEASURING

Application filed September 21, 1929. Serial No. 394,177.

The present invention relates to the art of effecting measurements with apparatus including a deflecting element such as the pointer of a meter, or analogous element movable back and forth along an indicator scale or across a scaled record surface, and the general object of the invention may be described as the provision of a simple and effective method of and means for magnifying or elongating the effective length of the scale of the apparatus.

In an ordinary measuring instrument, the length of the path of movement of the free end of the pointer or other element which deflects to indicate and/or record variations in the value of the quantity measured, is necessarily restricted by practical considerations limiting the size and cost of the instrument. The least count, or smallest change in value of the quantity measured which can be accurately indicated or recorded with such an instrument, must obviously vary inversely with the scale range, i. e. with the difference between the smallest and the largest values of the quantity which can be measured and indicated or recorded by the measuring instrument.

The size of the smallest change in the value of the quantity which can be measured with a given measuring system, is enlarged, in accordance with the present invention, by effecting adjustments of what may be called the quantity-scale relation of the system whenever the quantity measured attains a certain critical value or values. In consequence of such adjustments a particular position of the pointer or other deflecting member relative to the scale or scaled record surface corresponds to one or another value of the quantity measured accordingly as the value of said quantity is within one or another of certain definite different ranges of value of said quantity. The quantity-scale relation adjustments required by the present invention may be made in various ways. For example, in a case of an ordinary galvanometer in which the extent of pointer deflection is a function of the opposing action of the voltage impressed by a measuring circuit upon the galvanometer terminals, and the resistance to pointer deflection of a spring tending to hold the pointer in and to return it to its zero position, the quantity scale relation may be adjusted by adjusting the tension of said spring, or by adjusting the measuring circuit so that with different adjustment, the voltages impressed upon the galvanometer are in different proportions to the values of the quantity indicated by said voltages.

With a temperature measuring system of the ordinary kind heretofore employed, comprising a thermo-couple and a deflecting galvanometer employed to directly measure the thermo-couple voltage as the thermo-couple temperature varies between zero and a thousand degrees, the actual scale range of the meter, would be a thousand units, and no matter how accurately the temperature might be measured it could not be read from or recorded by the instrument without a possible reading or recording error of a couple of degrees or so. By effecting suitable adjustments in accordance with the present invention, the actual scale range of the meter in any one adjustment may be made to correspond not to a thousand degrees, but to a much smaller number of degrees. For example, if the measuring system were adjusted by adjustment of the torsion springs, by adjustment of resistance in the measuring circuit so that the pointer would be at the low end of the meter scale at zero temperature with one adjustment, and with other successively made adjustments, at temperatures of 250°, 500° and 750°, respectively, and with each adjustment would be moved from the low to the high end of the scale by a temperature increase of 250°, the practical effect would be to magnify the scale readings fourfold, and to divide the least count by four as compared with the results obtainable with the same meter if such adjustments were not made.

When the present invention is used with instruments which merely indicate, as well as with those which record, provisions are advantageously made for visually indicating, and, in the case of a recording instrument, for recording on the record surface, the particular quantity-scale relation existing at the time of observation or when any particular portion of the record is made. In the preferred form of recording instrument for use in carrying out the present invention, the continuous record curve which would be made on the record surface if the quantity-scale relation of the measuring system were not adjusted, is broken up into sections, each of which is in effect laterally displaced with respect to the preceding curve section, whenever a quantity-scale adjustment is made, so as to superpose the sections. In such case curve sections having different scale values may advantageously be identified and distinguished from one another by printing them in different colors, or by changing their forms i. e. by making one a dotted line, another a dot and dash line, etc., and in practice any of the usual expedients heretofore used in so-called multiple record instruments to distinguish records of different quantities recorded on a single record surface, may be employed to thus identify and distinguish record curve sections having different scale range values.

In a preferred mode of carrying out the invention I effect quantity-scale relation adjustments in such manner that the different scale ranges overlap, so that if, for example, what may be called the nominal scale ranges with any adjustment is 100 scale units, the first adjustment will be made not when the value of the quantity measured corresponds to 100 units, but to 110 units, and the reverse scale adjustment will be made not when the quantity value corresponds to 100° scale units but to 90° scale units. This overlapping of scale ranges reduces the number of quantity-scale adjustments required when the scale ranges do not overlap, not merely by increasing the actual scale range in any one adjustment above the nominal scale range, but also by eliminating the necessity for all but the first of the adjustments which would otherwise be required whenever the value of the quantity measured fluctuates within small limits respectively above and below the value which, when first attained, results in a scale range adjustment.

The various features of novelty which characterize my invention are pointed out with particularity in the claims annexed to and forming a part of this specification. For a better understanding of the invention, however, and the advantages possessed by it reference should be had to the accompanying drawings and descriptive matter in which I have illustrated and described a preferred embodiment of the invention.

Of the drawings:

Fig. 1 is an elevation of a portion of an ordinary recording instrument record strip with a record thereon made in the manner heretofore customary, of the variations in the value of a variable quantity;

Fig. 2 is an elevation of a portion of a record strip with a record thereon made in accordance with one form of the present invention, of the same values shown by the record of Fig. 1;

Fig. 3 is an elevation of a portion of a record strip having a record thereon made in accordance with a second form of the present invention of the same values shown by the records of Figs. 1 and 2;

Fig. 4 is a diagrammatic representation of measuring and recording apparatus adapted to produce the sort of record shown in Fig. 3; and Fig. 5 is an elevation at right angles to Fig. 4 illustrating a portion only of the mechanism shown in Fig. 4.

For the purpose of facilitating an understanding of the principles of the present invention, I have shown in Fig. 1, a conventional representation of a section of the record strip adapted for use in well known types of an ordinary recording instrument of the kind in which the record strip is moved at a definite speed past a recording element which is moved transversely of the record sheet in linear proportion to variations in the value of the quantity measured to thereby produce such a curve on the record strip A as the curve B shown in Fig. 1.

The lines $A^0$, $A^{100}$, $A^{200}$ and $A^{300}$, extending parallel to the direction of travel of the record strip past the recording element, are scale lines. For example, the line $A^0$ may be the zero scale line; the line $A^{100}$, the one hundred unit scale line; $A^{200}$, the two hundred unit scale line; and $A^{300}$, the three hundred unit scale line. With said scale lines representing such scale values, the section $a$ of the record strip A between the lines $A^0$ and $A^{100}$ contains all portions of the record curve B formed when the value of the quantity measured is within the range covered by the first hundred of scale units; the record section $b$ lying between the lines $A^{100}$ and $A^{200}$, contains all portions of the record curve B formed when the value of said quantity is within the range covered by the second hundred of scale units; the section $c$ contains all portions of the record curve B formed when the quantity recorded varies between the values represented by two hundred and three hundred scale units; and the portion $d$ of the record strip, at the right of the line $A^{300}$, contains the portion of the record curve B formed when the value of the quantity measured is greater than that corresponding to three hundred scale units.

In Fig. 1, the horizontal lines $A^5$ represent time intervals. The distance between an adjacent pair of lines $A^5$ may be the distance traveled by the record sheet during any convenient unit of time as, for example, one hour. In considering the record shown in Fig. 1, it is to be understood that that record was formed with the record strip travelling past the recording element in such direction as to form the portion of the record curve below any given point thereof, before forming the portion of the record curve above said point.

The entire curve B of Fig. 1 is reproduced without reduction in scale on the record sheet AA of Fig. 2 in sections $Ba$, $Bb$, $Ba'$, etc., between border scale lines $A^{10}$ and $A^{11}$ which are separated by the same distance as are the scale line $A^0$ and $A^{100}$ of Fig. 1. The record shown in Fig. 2 is produced by quantity-scale relation adjustments, one of which is effected in regular operation whenever the marking element reaches either scale line $A^{10}$ or $A^{11}$. Each of said adjustments shifts the marking element relative to the record strip from one side to the other of the strip record receiving portion lying between the scale lines $A^{10}$ and $A^{11}$.

For convenience of illustration, the sections $Ba$, $Ba'$, and $Ba^2$, of the curve B, formed on the record strip section $a$ of Fig. 1, are shown in Fig. 2 as full lines; the sections $Bb$, $Bb'$, $Bb^2$, $Bb^3$, $Bb^4$ and $Bb^5$ of the curve B appearing on the record strip section $b$ of Fig. 1, are shown as dotted lines in Fig. 2; the curve sections $Bc$, $Bc'$ and $Bc^2$ formed on the record strip section $c$ of Fig. 1, are shown in Fig. 2 as broken or dash lines; and the curve section $Bd$ of Fig. 1, is shown in Fig. 2 as a dotted line. In the actual use of the invention hereof, to produce such a record as is shown in Fig. 2, the recording mechanism may well be actuated in one or another of various ways well known and in common use in so-called multiple record instruments to make the record indications produced when one quantity scale relation prevails, different from those produced when another relation prevails. For example, instead of distinguishing the curve sections produced when different quantity scale relations exist by the form of the curve line as shown in Fig. 2, the different sections may be made in different colors, as by such use of a shiftable multi-colored transfer ribbon as is hereinafter described in connection with Figs. 4 and 5.

In addition to, or in lieu of the indentification quantity-scale relation prevailing when different sections of the record curve are formed by the shape or color of the sections, I may print on the record strip, on each quantity scale adjustment of the recording apparatus, the actual quantity values represented by either or both ends of each of the different curve sections. For example the numerical values of the quantity measured represented by the curve section ends at one or both side edges of the record strip may be printed with the corresponding quantity scale adjustments. In Fig. 2, such numerical values are shown as applied to the record strip AA adjacent and corresponding to the scale value of the lower end of each record curve section extending upwardly away from either of the scale margin lines $A^{10}$ and $A^{11}$. In lieu of, or in addition to either or both of the methods previously described for identifying the scale ranges of different record curve sections, a broken marginal line $A^7$ may be drawn on the record strip at it passes through the recording instrument, by mechanism adjusted by the scale quantity adjusting mechanism, so that said line $A^7$ will be composed of sections $A^{7a}$ formed during the periods in which the record sections $Ba$, $Ba'$, and $Ba^2$, etc. are being formed; while other portions $A^{7b}$, $A^{7c}$, and $A^{7d}$ of the line $A^2$, successively displaced from the sections $A^{7a}$, are traced during the respective periods in which are formed the portions of the record curve which are shown on the sections $b$, $c$ and $d$ of the record sheet A.

The method of record formation resulting in the record shown in Fig. 2 is open to the disadvantage that with it the quantity scale relation may occasionally require adjustment at unduly frequent intervals, i. e. during periods in which the value of the quantity being measured is oscillating through the values represented by any one of the scale lines $A^{100}$, $A^{200}$ and $A^{300}$ shown in Fig. 1. This difficulty may be avoided and the record curve sections drawn may be made somewhat easier to read at a glance by effecting quantity-scale adjustments only when the quantity measured departs from the previously existing nominal or normal scale range by a predetermined amount, in accordance with the procedure illustrated in connection with Fig. 3, now to be described.

With the procedure to which Fig. 3 pertains the different scale ranges may be said to overlap. The record strip AB shown in Fig. 3 is shown as provided not only with scale lines $A^{10}$ and $A^{11}$, as is the strip AA of Fig. 2, but also with scale line $A^{12}$ and $A^{13}$ at opposite sides of the scale line $A^{10}$, and scale lines $A^{14}$ and $A^{15}$ at opposite sides of the scale line $A^{11}$. The lines $A^{12}$ and $A^{13}$ are each separated from the line $A^{10}$, and lines $A^{14}$ and $A^{15}$ are each separated from the line $A^{11}$ by a distance corresponding to the scale range overlap. The extent of overlap obviously may vary with conditions. As shown in Fig. 3, the overlap extends the effective scale width with each adjustment 10 scale units, at each side of the nominal scale range of 100 units between the lines $A^{10}$ and $A^{11}$.

In producing the record shown in Fig. 3, the quantity scale relation of the measuring system is adjusted only when the quantity measured diminishes or increases in value to that represented, with the current scale range, by the scale line $A^{12}$ or by the line $A^{15}$, respectively. Moreover, the reduction in the frequency of adjustment required, is materially greater in some cases than would be obtained, for example, with the procedure to which Fig. 2 pertains, by merely increasing the scale range represented by the distance between the lines $A^{10}$ and $A^{11}$, since each of successive small variations in the value of the quantity measured may cause a quantity-scale adjustment with the procedure of Fig. 2, whereas with the procedure described in connection with Fig. 3, similar fluctuations in the value of the quantity measured could produce but a single scale range adjustment.

The significance of what has just been said will be apparent from a comparison of the effect of the changes in the value of the quantity measured, indicated by the curve portion formed by the sections $Bb^3$, $Bc^3$, $Bb^4$ and $Bc^4$, on the form of the record shown in Fig. 2, and the dissimilar effect of the similarly shaped portion of the curve section $Bb^5$ on the form of the curve shown in Fig. 3. With the method resulting in the record shown in Fig. 2, the successive changes in alternate direction of the value of the quantity measured from a value at one side, to a value at the other side of the value represented in Fig. 1 by the scale line $A^{200}$, produces an adjustment of the quantity-scale relation. This series of alternate adjustments start when the marking element reaches the curve point $B^9$. When the marking element reaches the analogously located point $B^{10}$ in forming the record of Fig. 3, scale range adjustment occurs, but the effect of this adjustment is to shift the marking element not to the opposite side edge of the record strip but to a point on the line $A^{14}$. In consequence no subsequent change in value of the quantity measured results in a scale range adjustment unless said change is at least as great as that represented by the 20 scale units distance between the lines $A^{14}$ and $A^{15}$. The practical importance of the form of the invention to which Fig. 3 pertains over the form to which Fig. 2 pertains, is obviously enhanced, by the fact that in many recording operations, the quantity measured frequently fluctuates during considerable periods of time, between values above and below but not greatly different from some value which may correspond to that represented by either margin of the record strip of Fig. 2 in some particular scale range adjustment of the measuring system.

While I regard the form of my invention resulting in the record illustrated in Fig. 3, as distinctly preferable in many cases at least to that resulting in the record shown in Fig. 2, the primary purpose and advantage of the present invention, namely, the magnification of the scale, or reduction in magnitude of the change that can be accurately determined, is obtainable as well with the one form of the invention as with the other.

In Figs. 4 and 5 I have illustrated the use of a preferred form of the invention in, and in connection with a conventionally and diagrammatically illustrated measuring system which comprises a deflection galvanometer D, and measures the temperature to which a thermo-couple T is subjected. The galvanometer pointer D' swings over a platen having a rib or straight edge $c$ and located above a feed roll C employed to advance a record strip such as the record strip A shown in Fig. 3 at a suitable speed. The pointer D' is intermittently depressed to grip the record strip and an inked ribbon transfer medium G above the record strip, between the pointer and the platen straight edge $c$ to thereby produce a record impression on the record strip at the point of intersection of the pointer and platen straight edge. The pointer is thus depressed by means of a depressor E and actuating means for the latter comprising levers E' and $E^2$, and a cam EI which is in engagement with the lever $E^2$ and is carried by an actuating shaft F rotating at a suitable speed.

As shown, the winding $D^2$ of the galvanometer is connected in series with a potentiometer energizing battery P, a slide wire resistance R, and resistance sections R', $R^2$, $R^3$ and $R^4$. A second slide wire resistance $R^0$ connected at one end to the same side of the battery P as is the galvanometer winding $D^2$, is connected to the slide wire resistance R by a sliding bridge or contact member S. The side of the battery P last referred to is connected through a resistance $R^{10}$, conductor 1, arc shaped contact $r$ and switch blade H to one or another of stationary contacts $r^1$, $r^2$ and $r^3$. The contact $r^1$ is connected to the connected ends of the resistances R' and $R^2$; the contact $r^2$ is connected to the connected ends of the resistances $R^2$ and $R^3$; and the contact $r^3$ is connected to the connected ends of the resistances $R^3$ and $R^4$. $D^3$ represents a torsion spring which tends to hold the pointer D' in its zero position, and which tends to return the pointer to its zero position when displaced therefrom with a force increasing with the extent of pointer displacement.

In so far as the above described, the apparatus illustrated conventionally and diagrammatically in Fig. 4, does not differ in principle, and need not differ in form from existing measuring apparatus of well known type. The measuring circuit described comprises a so-called split potentiometer, and with the contact S at or adjacent the ends of the slide wire resistances R and $R^0$ electrically remote from the battery P, the pointer D' will deflect on charges in the temperature, and consequently in the voltage, of the thermo-couple, to an extent proportional to the extent of said change. As shown the depressor E is formed with scale marks $e$ to indicate the extent of pointer deflection. The extent of deflection produced by a given thermo-couple temperature and voltage, may be varied by shifting the switch H from one to another of the contacts $r'$, $r^2$ and $r^3$. When the switch is in engagement with the contact $r^2$, a given deflection of the galvanometer requires a thermo-couple voltage greater than is required when the switch engages the contact $r'$ and less than is required when it engages the contact $r^3$.

The purpose of portions of the apparatus shown in Figs. 4 and 5 which have not yet been referred to, is to automatically adjust the switch H in the clockwise direction whenever, with the switch in engagement with either of the contacts $r'$ or $r^2$, the deflection of the galvanometer pointer exceeds a predetermined high value, and to adjust the switch H in the counter-clockwise direction whenever, with the switch on either of the contacts $r^2$ or $r^3$, the pointer deflection is less than a predetermined low value.

The adjustment of the switch H is controlled by a tilting pointer engaging member I, pivoted at $I'$ and having an arm $I^2$ normally gravity held in engagement with a cam EI carried by the actuating shaft F. When the arm $I^2$ is in engagement with the high portion of the cam EI, the member I is below the path of movement of the pointer D', but when the cutaway portion $EI'$ of the cam EI is in the position to permit it, the member I turns under the action of gravity into one or the other of three positions dependent upon the then position of the pointer D'. If the latter has passed to the low side of what may be called its normal range of deflection, a small movement of the member I then brings the pointer engaging part $I^4$ of the member into engagement with the pointer D', thereby arresting the movement of the member I. If the pointer is at the high side of its normal path of deflection when the cam EI permits the member I to turn under the action of gravity, the turning movement of the latter is arrested when the part $I^5$ of the member I engages the pointer. The upper edge of the part $I^4$ is at a higher level than the upper part of the part $I^5$ so that the latter does not arrest the movement of the latter until it has turned farther than it does when its movement is checked by the engagement of the part $I^4$ with the pointer. The portion $I^6$ of the member I connecting the parts $I^4$ and $I^5$ does not engage the pointer, and when the pointer is above the portion $I^6$, as is normally the case, the member I turns, when permitted by the cam EI, until it engages the stop $I^7$. To prevent the pointer D' from being bent or subjected to objectionable stress by the member I, a stationary abutment $i$ is disposed in position to be engaged by the pointer, after a slight upward deflection of the latter resulting from its engagement by either of the parts $I^4$ and $I^5$.

The angular adjustments of the member I selectively dependent, as above described, upon the deflections of the pointer D', control the operation of means through which the shaft F is operatively connected at intervals to the switch H, for adjustment of the latter in one direction or the other. The means shown in the drawing for thus operatively connecting the switch H to the shaft F, comprises a pawl member J having a stem portion pivotally connected at $J'$ to a lever $J^2$ fulcrumed at $J^3$, and having a portion $J^4$ held by a spring $J^6$ in engagement with a cam $J^5$ carried by the shaft F. The pawl member J comprises two spaced apart rigid pawl portions $J^7$ and $J^8$, located at opposite sides of the hub portion $H'$ of the switch member H which is mounted on a supporting shaft $H^2$.

A transverse adjustment of the member J in one direction moves the pawl $J^7$ into the path of movement of teeth $H^3$ formed on the hub portion $H'$ at one side of the latter and a transverse adjustment of the member J in the opposite direction moves the pawl $J^8$ into the path of movement of teeth $H^4$ formed on the hub $H'$ at its opposite side of the latter from the teeth $H^3$ thereof. The member J is given such transverse adjustments by a lever K pivoted at one end on a fulcrum pin $K'$, and having its other end $K^2$ in co-active relation with a cam $K^3$ carried by the shaft F. A spring $K^4$ acts on the lever K in a direction tending to hold its end $K^2$ in engagement with a cam $K^3$. The angular adjustments of the lever K give transverse adjustments to the pawl member J in consequence of the fact that the lever K carries a guide pin $K^6$ extending into a slot or guideway $J^9$ formed in the member J.

The angular position of the lever K depends at times upon the contour and angular position of the cam $K^3$, and at other times, depends upon the position of a secondary pointer member or selector L. The latter is adjusted by the member I into different positions dependent on the position of the pointer D when the latter is engaged by the member I. The selector L is connected at one end to a pivot pin $L'$ adjacent the pivotal axis $I'$ of the member I. A spring $L^2$ tends at all times to hold the opposite end of the selector against a projection $I^{10}$ of the member I, so that the turning movements of the latter tends to produce corresponding movements of the selector. The end of the selector L remote from the pivot $L'$ is formed with shoulders $L^5$ and $L^6$ located at different distances from the pivot $L'$. The shoulders $L^5$ and $L^6$ are so disposed relative to an engaging portion of the member K shown as a finger or projection $K^{10}$, that the latter will engage one, or the other, or neither of said shoulders according to the position of the member L when the high portion $K^{30}$ of the cam $K^3$ moves out of engagement with the cam engaging part $K^2$ of the lever K permitting the part $K^2$ to move toward the low portion $K^{31}$ of the cam $K^3$. The shaft F rotates in the direction indicated by the arrow in Fig. 4.

When the portion $I^5$ of the member I is in engagement with the pointer D', the member L is held in such position that the finger $K^{10}$ can engage the shoulder $L^5$. On such engagement the member J is held in such position that the pawl $J^7$ extends into the path of movement of the teeth $H^3$, and on a following longitudinal adjustment of the member J, effected through the cam $J^5$ and lever $J^2$, the pawl $J^7$ engages a tooth $H^3$ and adjusts the switch member H in the clockwise direction. When the portion $I^4$ of the member I engages the pointer D', the member L is not displaced from the position shown in Fig. 4, sufficiently to prevent the finger $K^{10}$ from moving past the lower end of the member L, at the left of the latter, until the lever K engages the stop $K^5$. On such engagement the pawl member J is held in such position that the pawl $J^8$ extends into the path of movement of the teeth $H^4$, and the following longitudinal adjustment of the member J, effected by the cam $J^5$ and lever $J^2$, results in a counter-clockwise adjustment of the switch member H. When the pointer D' is between the portions $I^4$ and $I^5$ of the member I, and the latter is in engagement with the stop $I^7$, the member L is held in such position that the finger $K^{10}$ can engage the shoulder $L^6$. On such engagement the transverse adjustment of the member J is the same as that shown in Fig. 4, and the following longitudinal adjustment of the member J, effected by the cam $J^5$ and lever $J^2$, is without effect on the adjustment of the member H.

While the finger $K^{10}$ engages the shoulder $L^5$ a finger $L^4$ carried by the selector L prevents the spring $L^2$ from moving the member L with the member I, as the latter returns the cam E to the position shown in Fig. 4. A premature return movement of the member L from the position in which the shoulder $L^6$ is engaged by the finger $K^{10}$ is prevented by the engagement of the finger $K^{10}$ with what may be called the base or shank of the shoulder $L^5$. During a considerable portion of each rotation of the cam $K^3$, a dwell portion $K^{32}$ of the latter engages the member K and holds the latter in the position shown in Fig. 4, so that neither of the pawls $J^7$ and $J^8$ can then engage a tooth $H^3$ or $H^4$. To effect the disengagement of the finger $K^{10}$ and selector L, and to permit the return of the latter into the position shown in Fig. 5 at the proper time, the cam $K^3$ is formed with a high portion $K^{33}$ intermediate the low portion $K^{31}$ and the dwell portion $K^{32}$, and at the opposite side of the shaft F from the high portion $K^{30}$. When the cam portion $K^{33}$ engages the end $K^2$ of the lever K, the latter is shifted to carry the finger $K^{10}$ out of the path of movement of the finger $L^4$. The movement of the cam part $K^{33}$ into and out of engagement with the end $K^2$ of the lever K, moves the pawl $J^7$ into and out of the path of movement of the teeth $H^3$, but this results in no adjustment of the switch H, however, as it occurs while the end $J^4$ of the lever $J^2$ is in engagement with a dwell portion $J^{52}$ of the cam $J^5$.

The general mode of operation of the apparatus shown in Figs. 4 and 5 will be readily understood from the foregoing. It will be understood, of course, that the various cams EI, $J^5$ and $K^3$ are shaped to actuate the parts E, I, $J^2$ and K at the proper times. Advantageously the arrangement is such that the depressor E will engage the pointer D' and make a record impression on the record strip AB shortly before the cam EI permits the member I to turn out of the position shown in Fig. 4. Immediately after a record impression is thus made, the cam EI permits the member I to turn under the action of gravity until its movement is arrested by the engagement of the part $I^4$ or the part $I^5$ with the pointer D', or is arrested by the stop $I^7$. Such movement of the member I selectively adjusts the secondary pointer L as previously described. Just prior to this selective adjustment of the member L, the high portion $K^{30}$ of the cam $K^3$ moves the lever K in a clockwise direction to carry the finger $K^{10}$ out of the path of movement of the member L. Immediately after said selective adjustment of the member L, the movement of the cam portion $K^{30}$ past the end $K^2$ of the lever K, the latter is turned in the counter-clockwise direction by the spring $K^4$, until the finger $K^{10}$ engages one of the shoulders $L^5$ or $L^6$, or, if the member L is then at the right of the finger $K^{10}$, until the lever K engages the stop $K^5$. The described movement of the lever K may selectively adjust the pawl member J as previously described so that the pawl $J^7$ will engage a tooth $H^3$ or the pawl $J^8$ will engage a tooth $H^4$, or so that neither pawl will engage a tooth on the hub of the switch member H when the member J is subsequently adjusted longitudinally by the action on the end $J^4$ of the lever $J^2$ of the rising portion $J^{50}$ of the cam $J^5$.

When such longitudinal adjustment gives a clockwise adjustment to the switch member H, the latter is moved out of engagement with the contact $r'$ into engagement with the contact $r^2$, or is moved out of engagement with the latter into engagement with the contact $r^3$. This adjustment of the switch H, which results from the movement of the galvanometer pointer D to the high side of its normal path of movement so that it is engaged by the part $I^5$ of the member I, changes the quantity-scale range of the measuring apparatus so as to diminish the deflection of the pointer D' produced by a given voltage of the thermo-couple T. As will be understood from what has previously been said, the increase in the quantity-scale relation thus effected, shifts the galvanometer pointer D' from a position above the right hand margin of the record strip AB, to a position above the scale line A$^{13}$ of the record strip AB.

When, following the direction of the pointer D' to the low side of its normal range of movement and its engagement by the portion I$^4$ of the member I, the pawl member J is longitudinally adjusted, its adjustment results in a counter-clockwise adjustment of the switch member H. Such adjustment moves the switch H out of engagement with the contact $r^3$ and into engagement with the contact $r^2$, or out of engagement with the latter and into engagement with the contact $r'$, and in each case, diminishes the quantity-scale relation of the apparatus. In consequence, the thermo-couple voltage which prior to the adjustment held the pointer D' above the left hand margin of the record strip AB, then becomes effective to hold the pointer D' above the scale line A$^{14}$ of the record strip.

Each longitudinal adjustment of the member J terminates when the high end of the rising portion J$^{50}$ passes out of engagement with the end J$^4$ of the lever J$^2$. Advantageously, and as shown, the immediate following portion J$^{51}$ of the cam J$^5$, is shaped to give a slight reverse longitudinal adjustment to the member J, sufficient to separate the pawl and tooth surfaces previously in contact, without giving any reverse adjustment to the member H. The following portion J$^{52}$ of the cam J$^5$ is a dwell, and while the end J$^4$ is in engagement therewith, the end K$^2$ of the lever K is moved by the rising side of the high portion of K$^{33}$ of the cam K$^3$ to retract the finger K$^{10}$, so that the member L, if previously restrained by the finger K$^{10}$ against such movement, can then move under the action of the spring L$^2$ into engagement with the arm I$^{10}$ of the member I. Previous to this retraction of the finger K$^{10}$, the member I is returned to the position shown in Fig. 5, by the action of the final part of the cutaway portion EI' of the cam EI.

When the cam portion K$^{33}$ effects the retraction of the finger K$^{10}$, as described, the pawl J$^8$ is moved into the path of movement of the teeth H$^3$, but as previously stated this does not adjust the switch member H. This results from the fact that while the cam portion K$^{33}$ is moving past the end K$^2$ of the lever K, the end J$^4$ of the lever J$^2$ is still in engagement with the dwell portion J$^{52}$ of the cam J$^5$. When the end K$^2$ of the lever K engages the dwell portion K$^{32}$ of the cam K$^3$, the pawl member J is transversely adjusted into the inoperative position in which neither of the pawls J$^7$ and J$^8$ is in position to be engaged by the teeth H$^3$ or H$^4$ respectively. As the shaft F thereafter continues to rotate until the various cams are returned to the positions shown in Fig. 4, the only operative result effected is due to the engagement of the end J$^4$ of the lever J$^2$ with the descending portion J$^{53}$ of the cam J$^5$. This results in a clockwise movement of the lever J$^2$ under the action of the spring J$^6$ which returns the pawl member J to the left hand end of its range of longitudinal adjustment.

It will be observed that the contour of the cam EI, and the relation of that cam to the parts E$^2$ and I$^2$ are such that the pointer D' is not restrained against deflection either by the depressor E or by the member I except for periods each a relatively small fraction only of the time required for a complete revolution of the shaft F. It will also be understood, of course, that by increasing the number of teeth H$^3$ and H$^4$ on the hub H' of the switch member H, and correspondingly increasing the number of switch contacts ($r'$, $r^2$ and $r^3$), and the number of potentiometer resistance sections (R$^2$ and R$^3$) connected to those contacts, the number of quantity-scale relation adjustments which can be made may be increased to any extent practically convenient or desirable.

As previously explained the apparatus may include provisions analogous to those now employed in so-called multiple recording instruments for shifting the transfer ribbon G to bring one or another of its differently colored sections G', G$^2$ or G$^3$ of the ribbon, above the straight edge $c$ when a quantity scale relation adjustment is effected, so that the record portions formed on the record strip AB, in any particular scale adjustment, will always be in the same color and different in color from the record portions formed with other quantity-scale adjustments of the apparatus. As diagrammatically illustrated in Fig. 4 such adjustment of the record transfer ribbon G is effected by provisions through which the angular position of the switch member H determines the angular position of the carrier frame $g$ on which the ribbon G is supported. The frame $g$ is pivotally supported by a shaft $g'$. The provisions shown for turning the frame $g$ into one position or another, depending upon the angular position of the switch H comprises a suitable cam surface $g^2$ formed on the frame $g$ and engaged by a cam roll H$^{10}$ carried by the switch member H. A spring $g^3$ is shown as acting on the frame $g$ to maintain engagement between the cam surface $g^2$ and the cam roll H$^{10}$.

With the recording instrument shown in Figs. 4 and 5, the printing of record curve sections of different scale values in different colors, provides an indication of the quantity scale adjustment existing at any instant. In the case of an indicating instrument other provisions, such as signal lamps, for showing the prevailing quantity-scale relation are ordinarily desirable and such other provisions may well be employed in some cases, as illustrated in Fig. 4, in connection with the recording instrument making a record which shows the quantity scale relations prevailing at different times.

The signal lamp arrangement shown diagrammatically in Fig. 4, comprises signal lamps $X'$, $X^2$ and $X^3$ selectively energized in accordance with the position of the switch arm H. As shown one terminal of each of the lamps $X'$, $X^2$ and $X^3$ is connected to one terminal of a source of current, the other terminal of which is connected to a switch contact $g^5$ secured to the member $g$, and the other terminals of the lamps $X'$, $X^2$ and $X^3$ are connected to stationary contacts $X^{10}$, $X^{20}$ and $X^{30}$, one or another of which is engaged by the contact $g^5$. When the member $g$ is to position one or another of the ribbon sections $G'$, $G^2$ and $G^3$ above the straight edge $c$ the contact $g^5$ is moved into engagement with one or another of stationary switch contacts $X^{10}$, $X^{20}$ and $X^{30}$, respectively, thereby energizing the corresponding lamps $X'$, $X^2$ or $X^3$. To avoid possible confusion it is noted that the normal scale range represented in Fig. 5 by the distance along the scale E between the scale mark $e$ to which the numeral 0 pertains and the scale mark $e$ to which the number 100 pertains, corresponds to the scale range between the lines $A^{13}$ and $A^{14}$ in Fig. 3.

As will be readily understood by those skilled in the art, when the deflecting element is a pivoted pointer as in the instrument shown in Figs. 4 and 5, and the angular deflection of the pointer is proportional to the change in the value of quantity being measured, a given horizontal distance along the scale E if the latter is not curved but straight as shown, and a given horizontal distance on the record formed by the aid of the straight edge $c$, represents a larger change in the value of the quantity measured, adjacent the ends of the scale or the side edges of the record strip than when closer to the center of the scale or record strip.

The matter last referred to does not need to be taken into account in the case of an instrument in which the scaled and recorded movements of a deflecting element are in linear proportion to the changes in value of the quantity measured, as is the case for example in the ordinary potentiometer operating in accordance with the null method.

In such an instrument a contactor such as the switch S is moved along a potentiometer resistance, such as the resistance R, as required to rebalance the potentiometer whenever unbalance of the latter is indicated by the deflection away from a neutral position of the pointer $D'$. When so operated the movements of the contactor S along the resistance R are exactly or approximately in linear proportion to the changes in the thermo-couple voltage. In the practice of the present invention in connection with the described null method use of the apparatus shown in Fig. 5, the switch H should be adjusted in one direction or the other when the contact S reached one or the other limit of its desired range of movement along R.

While in accordance with the provisions of the patent statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention what I claim as new and desire to secure by Letters Patent, is:—

1. The improved method of measuring which consists in causing changes in the value of the quantity measured to deflect an element in proportion to said changes, and causing the deflection of said element to alter said proportion whenever the value of said quantity reaches either limit of any one of successive ranges of value of said quantity and thereby effect a reverse deflection of said element.

2. The improved method of measuring which consists in causing changes in the value of the quantity measured to deflect an element in proportion to said changes, and causing the deflection of said element to alter said proportion whenever the value of said quantity reaches either limit of any one of successive ranges of value of said quantity and thereby effect such a reverse deflection of said element that the variations in value of said quantity through each of said ranges produce deflections of said element through a single range of deflection.

3. The improved method of measuring which consists in causing changes in the value of the quantity measured to deflect an element in proportion to said changes, and causing the deflection of said element to alter said proportion whenever the value of said quantity reaches either limit of any one of successive ranges of value of said quantity and thereby effect a reverse deflection of said element and recording the deflections of said element and the successively produced changes in said proportion on a travelling record surface.

4. The improved method of measuring which consists in causing changes in the value of the quantity measured to deflect an element in proportion to said changes, and causing the deflection of said element to alter said proportion whenever the value of said quantity reaches either limit of any one of successive ranges of value of said quantity and thereby effect a reverse deflection of said element and indicating the proportion existing following each such change in proportion.

5. The improved method of measuring which consists in causing changes in the value of the quantity measured to deflect an element in proportion to said changes, and causing the deflection of said element to alter said proportion whenever the value of said quantity reaches either limit of any one of successive and overlapping ranges of value of said quantity and thereby effect a reverse deflection of said element.

6. In a measuring system including a deflecting meter element and means for subjecting it to a deflecting force proportional to the value of the quantity measured, the improvement comprising means actuated by the deflection of said element to either limit of a predetermined range of deflection, for adjusting said system to vary the proportion between the value of said quantity and the corresponding deflection of said element and thereby produce a reverse deflection of the latter.

7. In a measuring system including a deflecting meter element and means for subjecting it to a deflecting force proportional to the value of the quantity measured, the improvement comprising means actuated by the deflection of said element to either limit of a predetermined range of deflection, for adjusting said system to vary the proportion between the value of said quantity and the corresponding deflection of said element and thereby produce a reverse deflection of the latter somewhat smaller than said range of deflection.

8. In a measuring system including a deflecting meter element and means for subjecting it to a deflecting force proportional to the value of the quantity measured, the improvement comprising means actuated by the deflection of said element to either limit of a predetermined range of deflection, for adjusting said system to vary the proportion between the value of said quantity and the corresponding deflection of said element and thereby produce a reverse deflection of the latter, and proportion indicating means adjusted when said system is adjusted to vary said proportion.

9. In a measuring system including a deflecting meter element and means for subjecting it to a deflection force proportional to the value of the quantity measured, the improvement comprising means actuated by the deflection of said element to either limit of a predetermined range of deflection, for adjusting said system to vary the proportion between the value of said quantity and the corresponding deflection of said element and thereby produce a reverse deflection of the latter, and recording mechanism for recording the deflections of said element, and the adjustments made in said system.

10. The combination in a measuring system including a deflecting meter element and means for subjecting said element to a deflecting force varying in proportion to changes in the value of the quantity measured, of means selectively controlled by the position of said element adjusting the first mentioned means whenever said element reaches either limit of a normal range of deflection to adjust the first mentioned means and thereby vary said proportion to reversely deflect said element into proximity with the other limit of its range of deflection.

11. Measuring and recording instrument comprising a deflecting element, and means for subjecting said element to a deflecting force varying in proportion to the changes in variable quantity to be measured and including means adjustable to vary said proportion, means controlled by the position of said deflecting element for adjusting said adjustable means in the direction to produce a reverse deflection of said element whenever the latter moves to either limit of its normal range of deflection and recording mechanism coacting with said element to record the position of the latter and coacting with said adjusting means to record the adjustments of said adjusting means.

12. A measuring system comprising a potentiometer including an element deflecting in proportion to the value of the quantity measured and a resistance adjustable to vary said proportion and means controlled by the position of said element for adjusting said resistance whenever said element reaches either limit of its range of deflection to thereby effect a reverse deflection of said element.

13. In a measuring instrument the combination with a deflecting element of control mechanism selectively dependent upon the position of said element along its path of deflection, said mechanism comprising a member having element engaging portions adjacent the ends of said path and normally transversely separated from said path by unequal distances, and means for periodically moving said member toward said path into one position when said element is intermediate the ends of said path, and into second or third positions when said element is at one end or the other of its path, and the movement of said member is then arrested by the engagement of one or the other of said portions with said element.

Signed at Philadelphia, in the county of Philadelphia and State of Pennsylvania, this 19th day of September, A. D. 1929.

THOMAS R. HARRISON.